US007473899B2

(12) United States Patent
Chi et al.

(10) Patent No.: US 7,473,899 B2
(45) Date of Patent: Jan. 6, 2009

(54) MOTION DETECTOR DEVICE WITH ROTATABLE FOCUSING VIEWS AND A METHOD OF SELECTING A SPECIFIC FOCUSING VIEW

(75) Inventors: Yung Chih Chi, Taipei Hsien (TW); Wen Chin Chen, Taipei Hsien (TW)

(73) Assignee: IQ Group SDN BHD, Pulau Pinang (MY)

( * ) Notice: Subject to any disclaimer, the term of this patent is extended or adjusted under 35 U.S.C. 154(b) by 318 days.

(21) Appl. No.: 11/438,186

(22) Filed: May 22, 2006

(65) Prior Publication Data

US 2006/0266944 A1 Nov. 30, 2006

(30) Foreign Application Priority Data

May 25, 2005 (MY) .............................. PI 20052360

(51) Int. Cl.
*G01J 5/02* (2006.01)

(52) U.S. Cl. .................................. 250/353; 250/DIG. 1

(58) Field of Classification Search ................. 250/353, 250/DIG. 1
See application file for complete search history.

(56) References Cited

U.S. PATENT DOCUMENTS 6,348,691 B1 * 2/2002 Sandell et al. .............. 250/353
6,747,275 B2 * 6/2004 Raper et al. ................. 250/342
2002/0020816 A1 2/2002 Leen
2002/0158204 A1 * 10/2002 Liao et al. ................... 250/353

OTHER PUBLICATIONS

Search Report from corresponding European Patent Application No. EP 06252655.3 dated Sep. 4, 2006.

* cited by examiner

*Primary Examiner*—David P Porta
*Assistant Examiner*—Mindy Vu
(74) *Attorney, Agent, or Firm*—Wolf, Greenfield & Sacks, P.C.

(57) ABSTRACT

According to the present invention, a preferred embodiment of a motion detector device comprises a lamp assembly, a junction box assembly with a cylindrically shaped holding arm, a rotation assembly incorporating a sensor seat, a pyro-sensor and circuitry, and a lens assembly. The lens assembly can assume a semi-spherical or cylindrical shape. The lens assembly is integrally formed by a plurality of multifaceted lenses with pre-determined focuses constituting pre-determined focusing views. Each focusing view is defined for a range/distance and angle of detection. The lens assembly can be rotated to select a specific focusing view. The sensor seat is disposed at the focus of the selected focusing view to receive infrared radiation rays. The entire or half or portion of the lens assembly carries lenses making up the pre-determined focusing views. The present invention also teaches methods of selecting a specific focusing view for a motion detector device.

5 Claims, 13 Drawing Sheets

Figure 6a
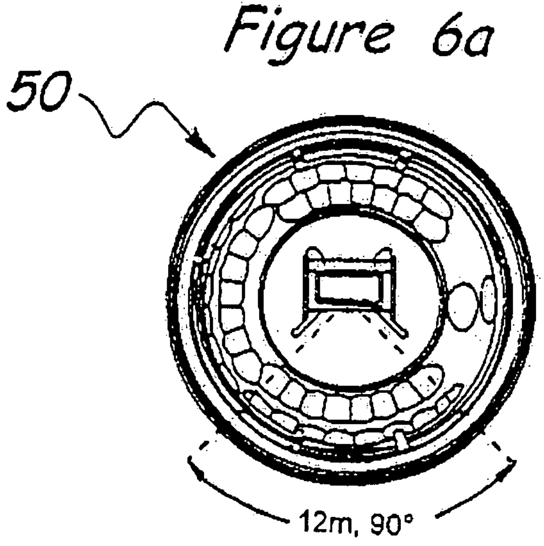
Figure 6b
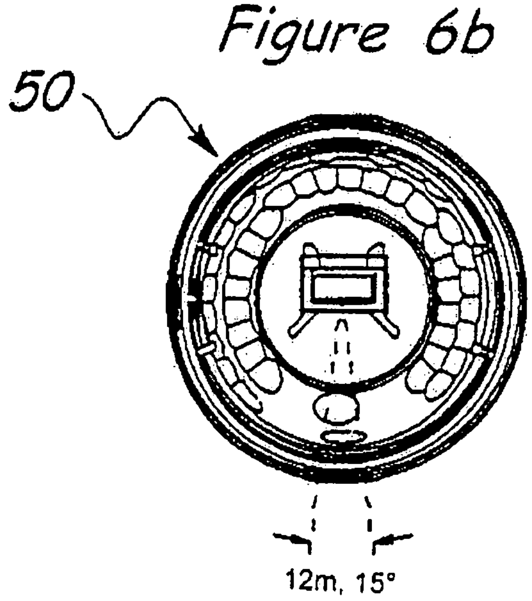
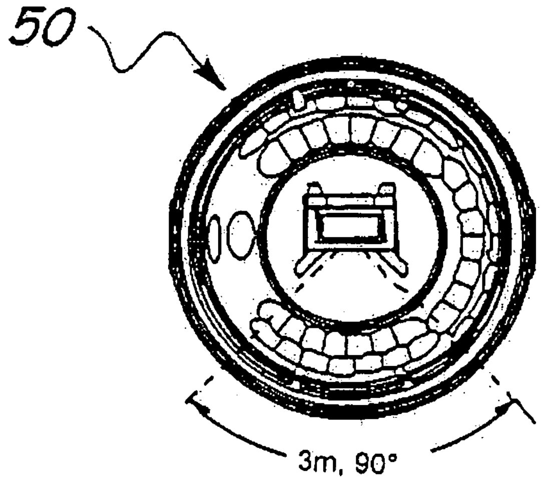
Figure 6c
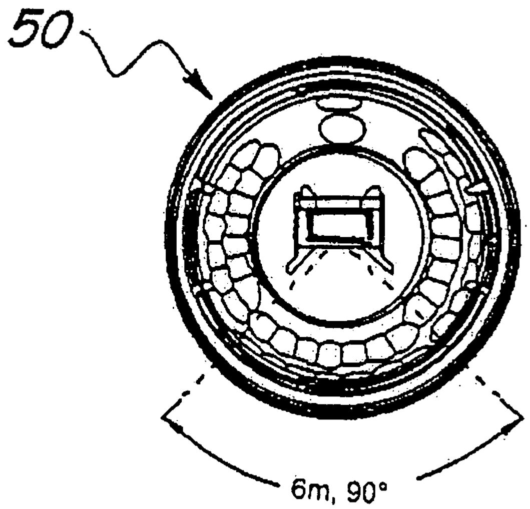
Figure 6d

MOTION DETECTOR DEVICE WITH ROTATABLE FOCUSING VIEWS AND A METHOD OF SELECTING A SPECIFIC FOCUSING VIEW

FIELD OF THE INVENTION

The present invention relates generally to an infrared radiation motion detector device. In particular, it relates to a motion detector device, with a lens assembly incorporated with different focusing views that can be selected separately and individually, as well as a method of selecting a particular focusing view.

BACKGROUND OF THE INVENTION

A prior art infrared motion detector device essentially comprises an arc lens assembly, and a pyro-sensor with electrical circuitry. The arc lens is made up of high-density polyethylene (HDPE) polymeric material. Optical focal points can be designed onto the lenses in Fresnel or dotted configuration. A stacked-up multifaceted arc lens assembly made from Fresnel configuration comprises a plurality of optical segments with individual focus arranged in layers, making up a focusing view. A stacked-up multifaceted arc lens assembly made from dotted configuration comprises a plurality of optical focuses provided in optical segments in layers, making up a focusing view. A focusing view is determined by the angle of detection, up to a maximum of 360 degrees, as well as the detection range. This can be considered as the detection coverage.

During installation to cover an area, an installer will consider how far the motion detector device should cover and how wide the motion detector device should receive infrared rays. A focusing zone is therefore covered by the angle of detection and the range/distance of detection in the focusing view.

There are associated problems with prior art methods of adjusting the detection range. One method is to adjust the electronic sensitivity, with the assistance of a variable resistance knob. Since the turning of the knob is not calibrated with the distance, field adjustment requires a lot of trials and errors. Another method is to adjust the detection device by rotating horizontally and tilting vertically. As seen in FIG. 1, horizontal rotation is achieved with the assistance of a rotation bracket (33). As seen in FIG. 2, vertical tilting is achieved with the assistance of a swivel joint (35). Since the rotating or tilting is not calibrated with the distance, field adjustment also requires a lot of trials and errors.

The prior art lens of a prior art motion detector device comprises optical layers where top layers cover a longer distance. To render a short-range detection, the top layers are usually masked or covered. As seen in FIG. 3, the lenses (52) are semi-spherically shaped and a lens masking means (53) hinged at both sides of the lenses (52) is used to cover selectively a layer or more of the lenses (52). The use of lens masking means (53) can take the form of masking tape or snap-on plastic sheet. This masking usually leads to a discounted visual appearance of overall product aesthetics after installation. This is especially true if the motion detector device is integrated with a decorative lighting fixture, in which the recommended mounting height is about 1.8 m typically next to an entrance of a premise or the doorway of a building.

There are associated problems with prior art methods of adjusting angle of detection coverage. The angle of detection is determined by the design (known as field of view) of pyro-sensor used in the motion detector device as well as the focusing view of the lenses. In a situation where a motion detector device is aimed to cover a narrow territory such as a passageway next to a public service road, any motion within the focusing zone covered i.e. the passageway would emit infrared rays, which should be picked up within the focusing view of the lenses and subsequently the field of view of pyro-sensor. Any infrared rays in the public service road should not be detected, otherwise a "false alarm" would be triggered. One usual method is to mask the unwanted side segments of the optical lenses. The focusing view of the lenses is then curtailed, so that only infrared rays from the focusing zone enter the narrow focusing view of the lenses. Alternatively, a lens masking means (53) is employed to selectively cover a segment of the semi-spherically shaped lenses as seen in FIG. 3.

The main disadvantage of prior art motion detector devices is that the lens assembly is substantially permanent and only one focusing view is therefore designed for use. This feature does not facilitate on-site selection flexibility. In practice, depending on the actual physical orientation of the premise to be covered, a prior art with a fixed focusing view may not be optimally used for installation. Hence, where there are different prior art motion detector devices with different fixed focusing views, different spare parts need to be manufactured and the cost invariably goes up.

SUMMARY OF THE INVENTION

A primary objective of the present invention is to overcome the selection rigidity of prior art motion detector devices incorporated with one fixed focusing view.

Accordingly, the present invention discloses a motion detector device incorporated with a plurality of focusing views that can be selected at will. In a preferred embodiment of the invention, four focusing views are incorporated to form a lens assembly (50), which is rotatable. The lens assembly (50) can be semi-spherically or cylindrically shaped. At the focus of this lens assembly (50), a sensor seat and a pyro-sensor (43) are placed and connectable to the rest of the circuitry of a motion detector device. To facilitate alignment and to define each focusing view precisely, indicating lines are provided on the circumference of a rotation assembly to correspond to the pyro-sensor (43). Zone-indicating marks are provided on the circumferential lens frame of the lens assembly for alignment. Stacked-up layers of different segments of dotted lens configuration or Fresnel lens configuration cater for different ranges and angles of detection coverage, each segment designed for a specific focusing view.

The invention will be described in more details of one preferred embodiment of the invention, by way of example, with reference to the following drawings.

BRIEF DESCRIPTION OF THE DRAWINGS

FIG. 6*a* shows the plan view of a lens assembly with its sensor seat facing the surface pattern on the lens assembly indicating the focusing view of 12 meters and 90 degrees.

FIG. 6*b* shows the plan view of a lens assembly with its sensor seat facing the surface pattern on the lens assembly indicating the focusing view of 12 meters and 15 degrees.

FIG. 6*c* shows the plan view of a lens assembly with its sensor seat facing the surface pattern on the lens assembly indicating the focusing view of 3 meters and 90 degrees.

FIG. 6*d* shows the plan view of a lens assembly with its sensor seat facing the surface pattern on the lens assembly indicating the focusing view of 6 meters and 90 degrees.

DETAILED DESCRIPTION OF A PREFERRED EMBODIMENT

In the following description, similar numerals are used to indicate similar components in the prior art and the present invention where applicable. Otherwise, other numerals are used to indicate new components in the invention.

Figure 1:
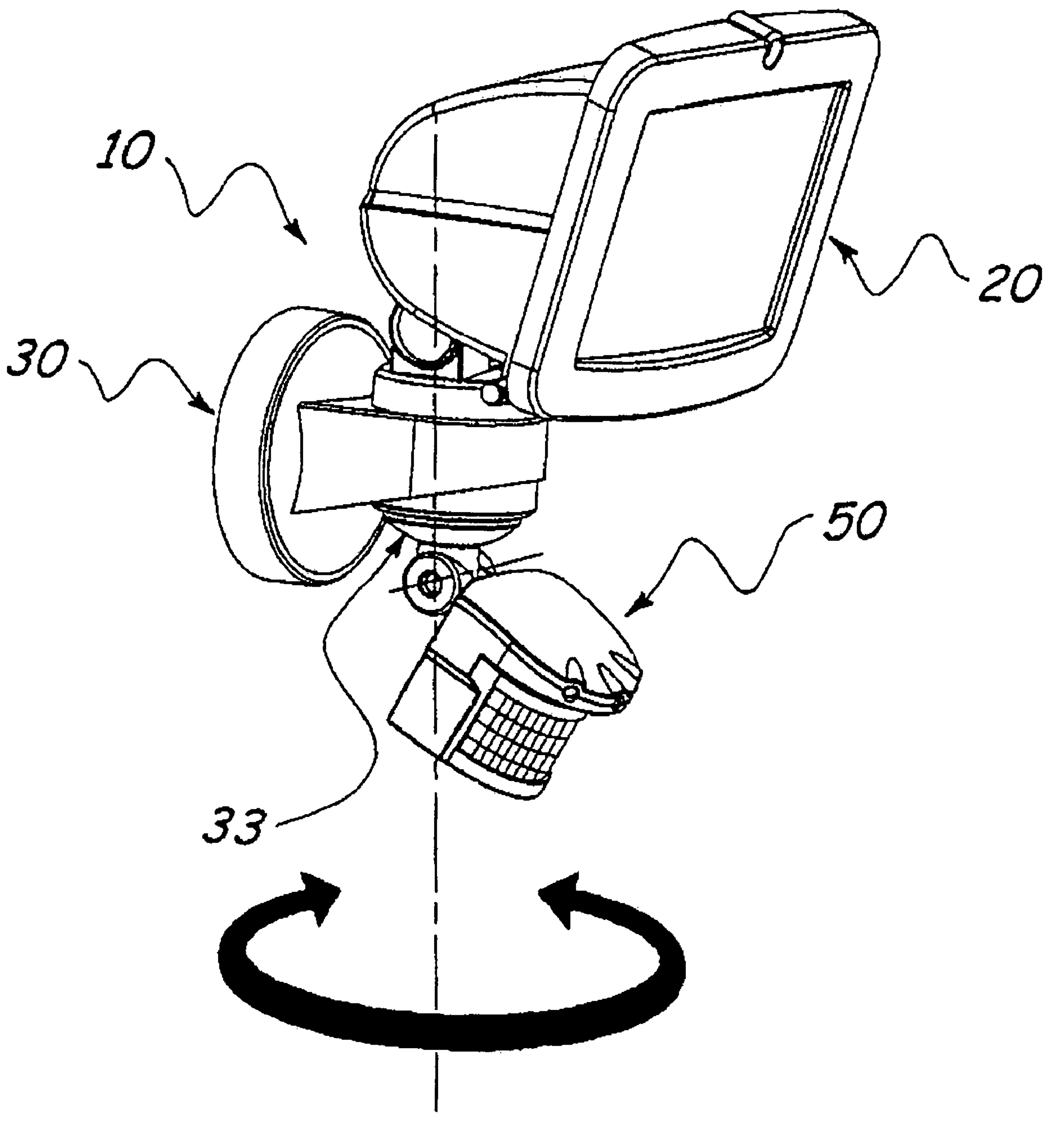
FIG. 1 shows a perspective view of a prior art motion detector device where its fixed lens assembly is horizontally rotated.
Figure 2:
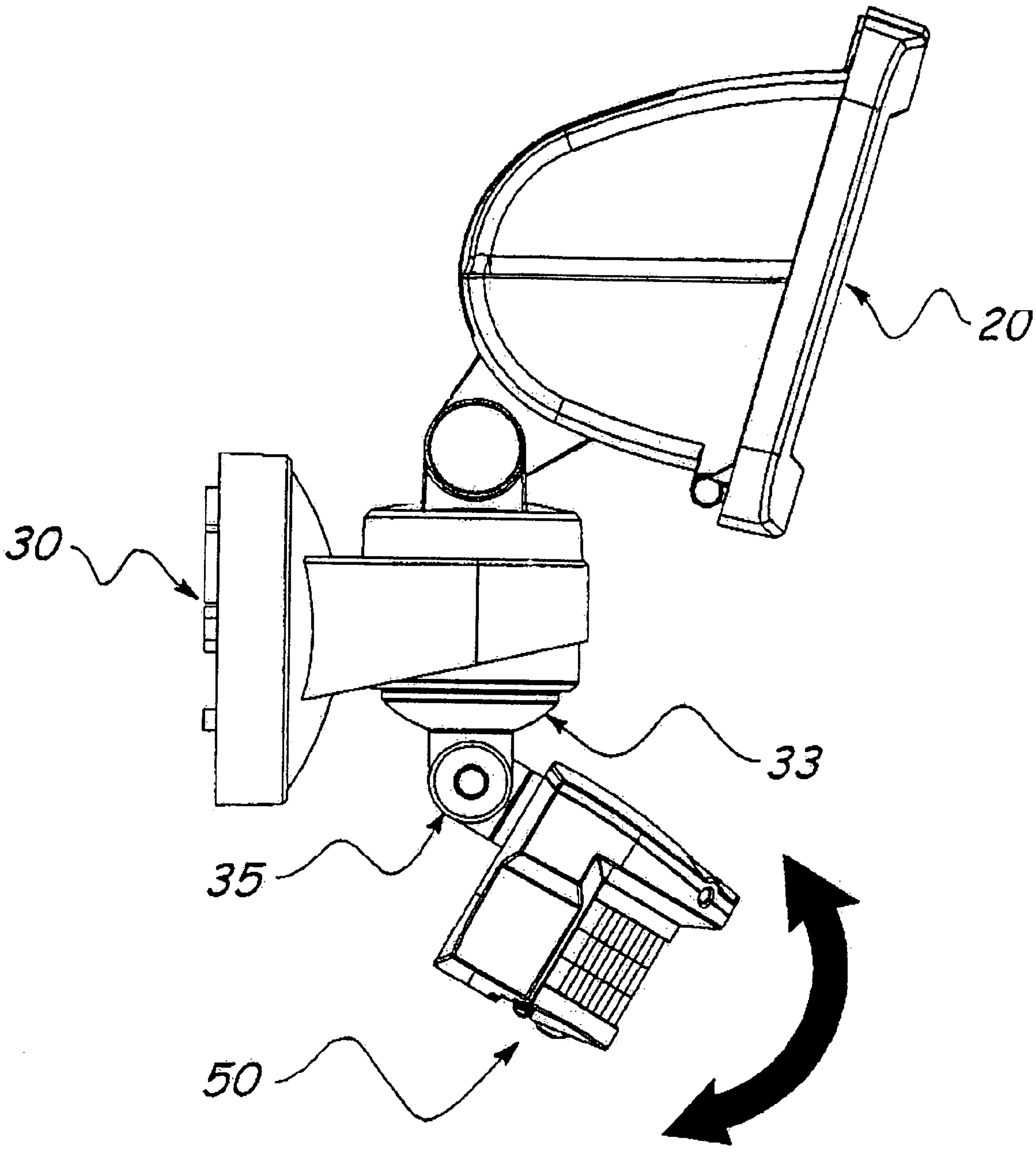
FIG. 2 shows a side view of a prior art motion detector device where its fixed lens assembly is tilted vertically.
Figure 3:
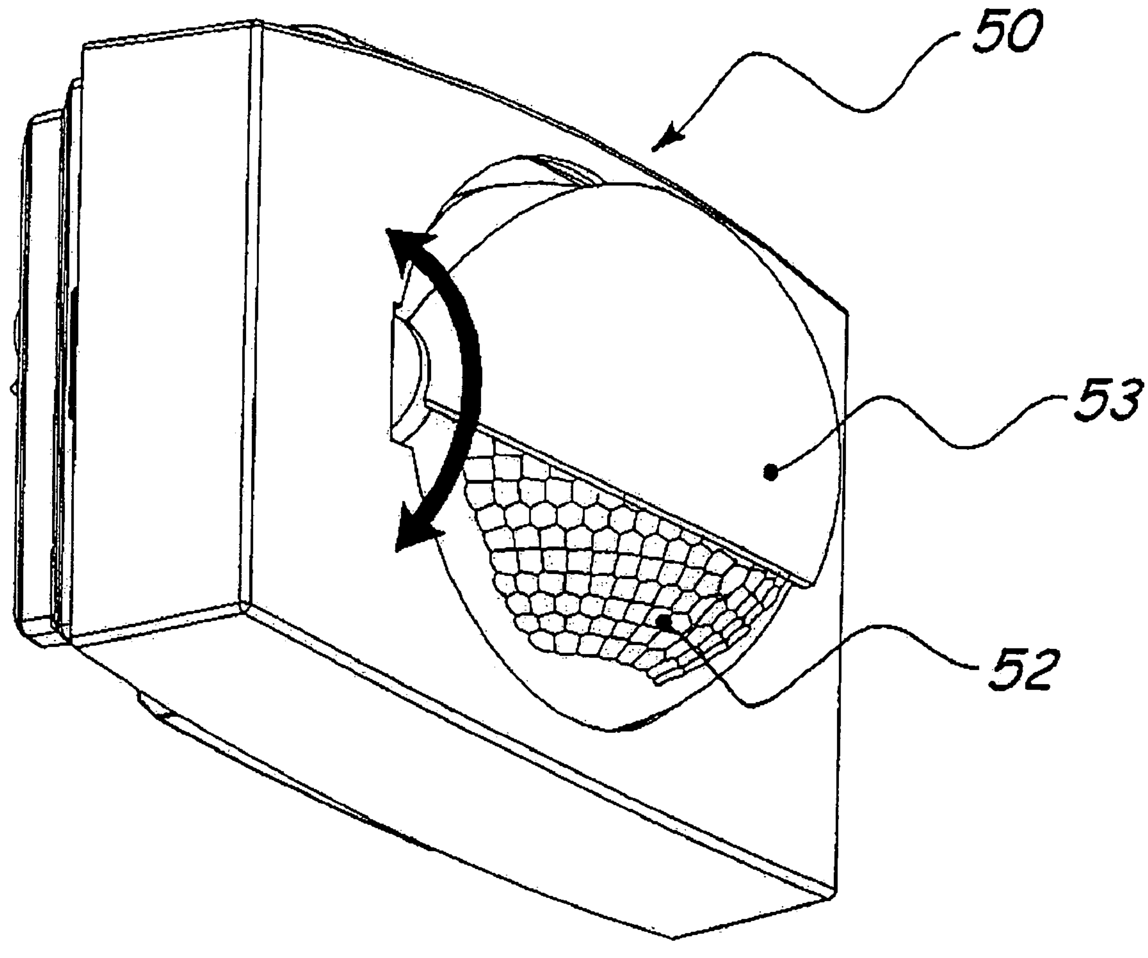
FIG. 3 shows a perspective view of a prior art semi-spherically shaped lens assembly with a lens masking means.
Figure 4A:
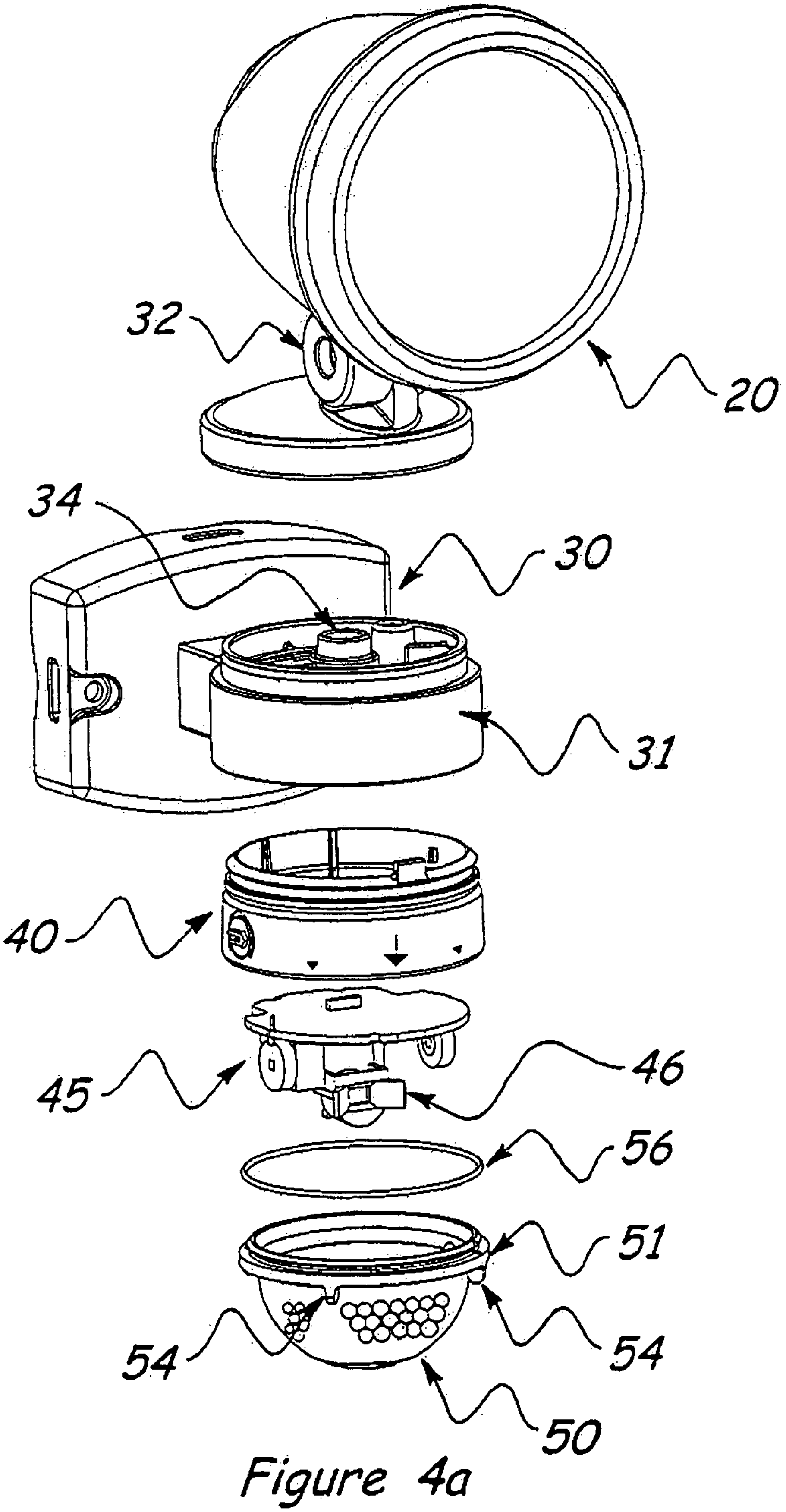
FIG. 4*a* shows an assembly diagram of the main components of a preferred embodiment of a motion detector device in accordance to the invention.

As seen in FIG. 4*a*, the main components of a preferred embodiment of the invention comprise, from top to bottom, a lamp assembly (20), a junction box assembly (30) with a holding arm (31), a rotation assembly (40), a main printed circuit board (PCB) assembly (45) with a sensor seat (46) and a pyro-sensor (43), and a lens assembly (50) which can be semi-spherically or cylindrically shaped. The lamp assembly (20) is rotationally attached to the top-side of the holding arm (31) with the assistance of a vertical swivel (34) and a horizontal swivel (32). The holding arm (31) is cylindrically shaped. The vertical swivel (34) facilitates a horizontal rotation. The horizontal swivel (32) facilitates tilting of the lamp assembly (20). The rotation assembly (40) is rotationally attached to the bottom side of the holding arm (31). The main PCB assembly (45) is attached to the rotation assembly (40) by means of a screw. The main PCB assembly (45) is thus locked to the rotation assembly (40). In other words, the two assemblies (40, 45) move together and rotate about the central axis of the holding arm (31). The lens assembly (50) overhangs rotationally from the underside of the rotation assembly (40). A lens gasket (56) is sandwiched between the lens assembly (50) and the rotation assembly (40) to prevent water ingress. Zone-indicating marks (54) are provided along a circumferential lens frame (51) of the lens assembly (50).

Figure 4B:
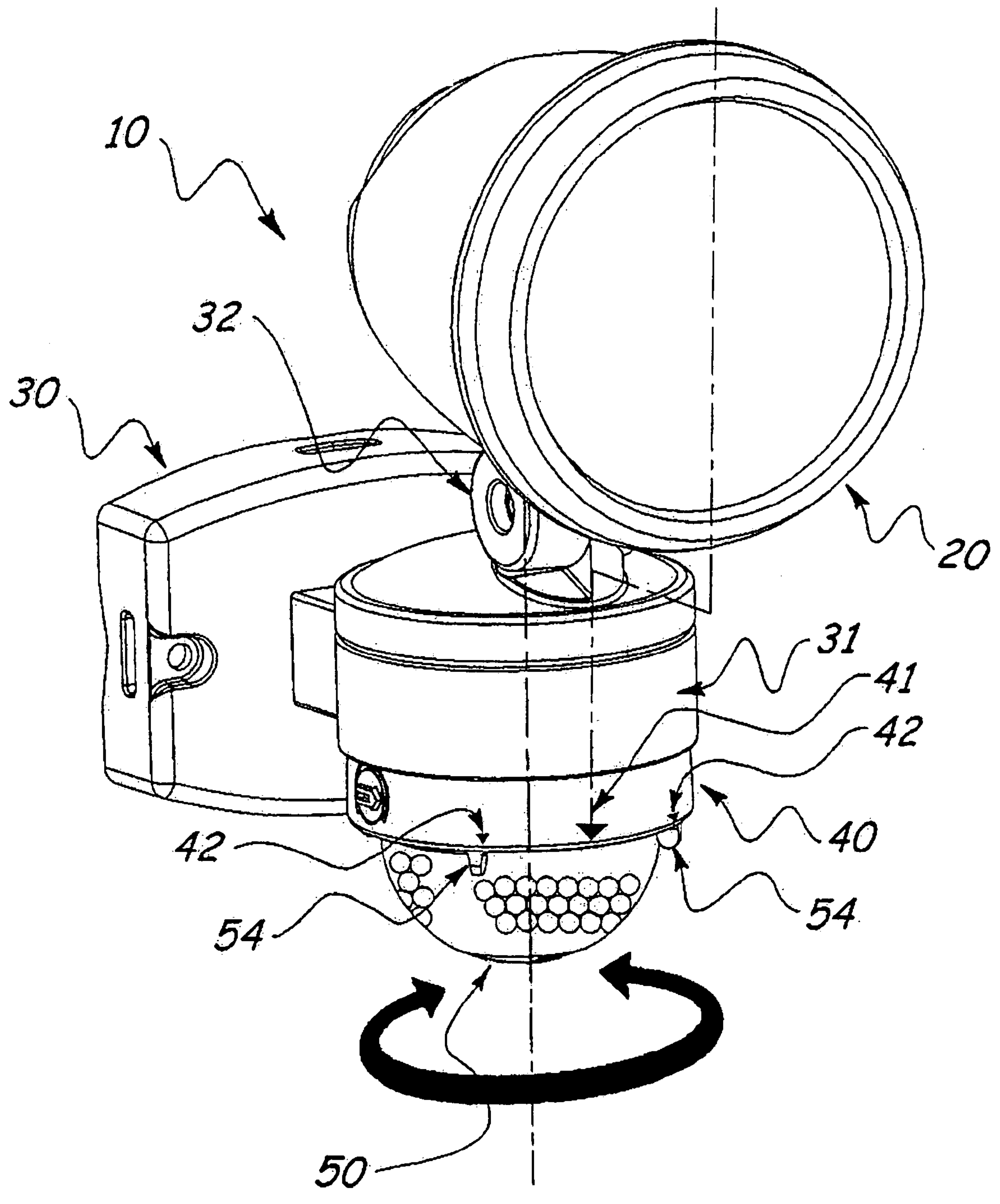
FIG. 4*b* shows a perspective view of the preferred embodiment turned to one side.

As seen in FIG. 4*b*, the motion detector device (10) is assembled. The junction box assembly (30) connects the source of electricity to the motion detector device (10). The junction box assembly (30) is usually installed onto a wall or a post. The lamp assembly (20), disposed above the holding arm (31), is rotatable relative to the central axis of the holding arm (31). It is turned to one side of the device. The rotation assembly (40), disposed underneath the holding arm (31), is also rotatable about the central axis of the holding arm (31). A central indicating line (41) on the rotation assembly (40) is aligned with the vertical axis of the lamp assembly (20). The lens assembly (50) is rotationally attached below to the exposed end of the rotation assembly (40). Zone-indicating marks (54) on lens frame (51) are aligned with side indicating lines (42) on the rotation assembly (40). It is important to note that these assemblies (20, 40, 50) are to be aligned in three steps. This three-step alignment is essentially achieved by rotating the lamp assembly (20) to face a focusing zone, rotating the rotation assembly (40) about the central axis of the holding arm (31) while aligning the vertical axis of the lamp assembly (20) with the central indicating line (41) on the rotation assembly (40), and rotating the lens assembly (50) relative to the central axis of the holding arm (31) while aligning the zone-indicating marks (54) on the lens frame (51) with the side indicating lines (42) on the rotation assembly (40).

Once again, the alignment steps are explained below. A dotted vertical axis is shown on the lamp assembly (20). On the rotation assembly (40), which is locked with the main PCB assembly (45) including the sensor seat (46), three indicating lines (41, 42) are provided. A central indicating line (41) corresponds to the centre of the sensor seat (46), and two side indicating lines (42) correspond to the maximum angle of two wings (44) provided on the sensor seat (46). By alignment, the vertical axis of the lamp assembly (20) is first rotated to aim at the physical surrounding to be covered; the dotted vertical axis of the lamp assembly (20) and the central indicating line (41) of the rotation assembly (40) are next placed in line; the two zone-indicating marks (54) franking the focusing view of the lens assembly (50) are finally placed in line with the side indicating lines (42) on the rotation assembly (40). The entire motion detector device (10) is thus aligned. It is important to note that the zone-indicating marks (54) are provided along the circumferential lens frame (51) of the lens assembly (50), in between the edges of the particularly designed focusing views. By aligning two appropriate zone-indicating marks (54) with the two side indicating lines (42) on the rotation assembly (40), a specific focusing view is thus selected.

Figure 4C:
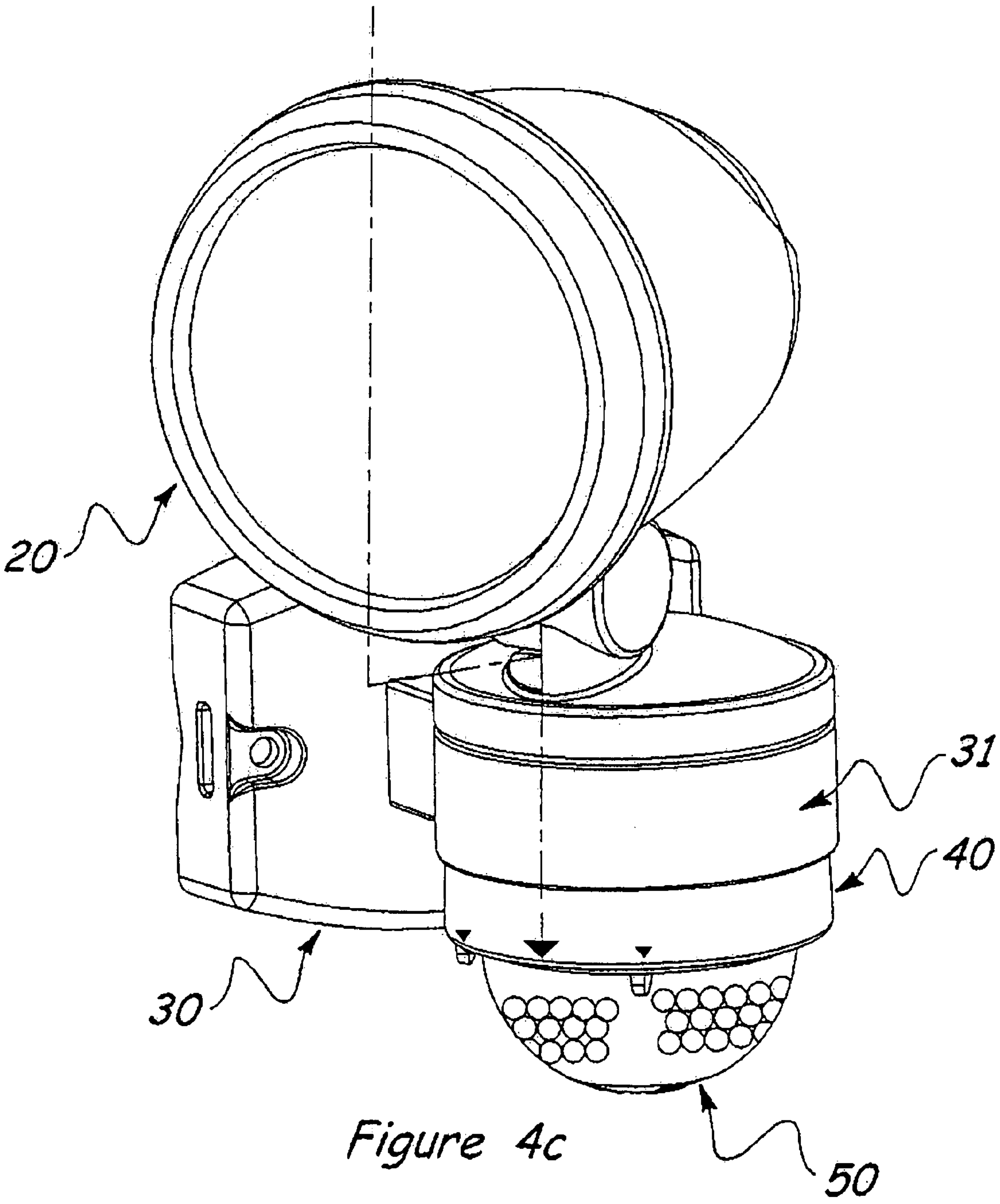
FIG. 4*c* shows a perspective view of the preferred embodiment turned to another side.
Figure 5A:
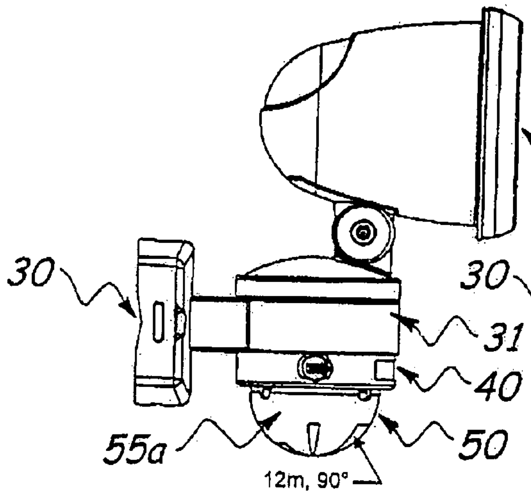
FIG. 5*a* shows a first detection position of the motion detector device selected for a zone of 12 meters and 90 degrees.
Figure 5B:
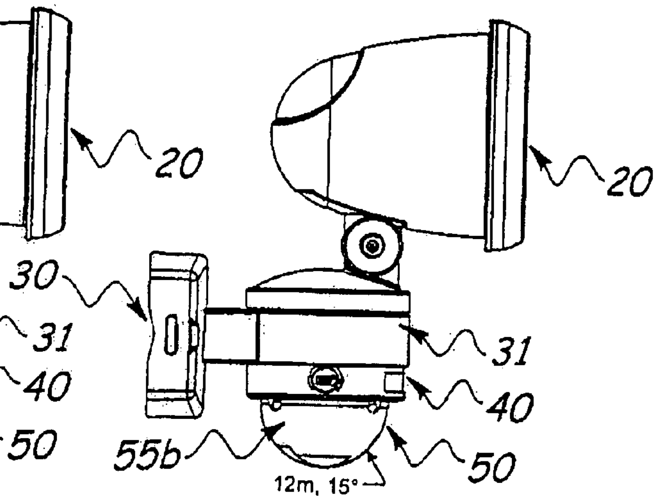
FIG. 5*b* shows a second detection position of the motion detector device selected for a zone of 12 meters and 15 degrees.
Figure 5C:
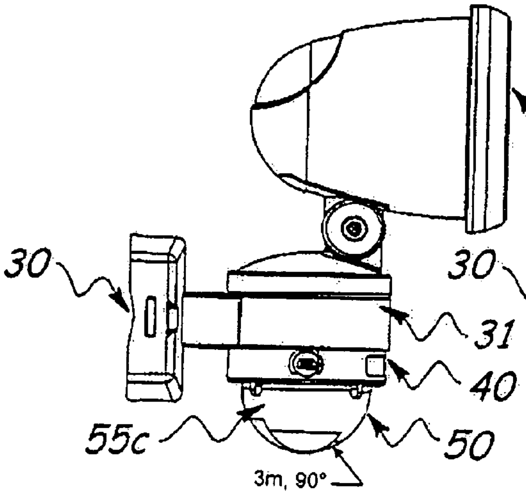
FIG. 5*c* shows a third detection position of the motion detector device selected for a zone of 3 meters and 90 degrees.
Figure 5D:
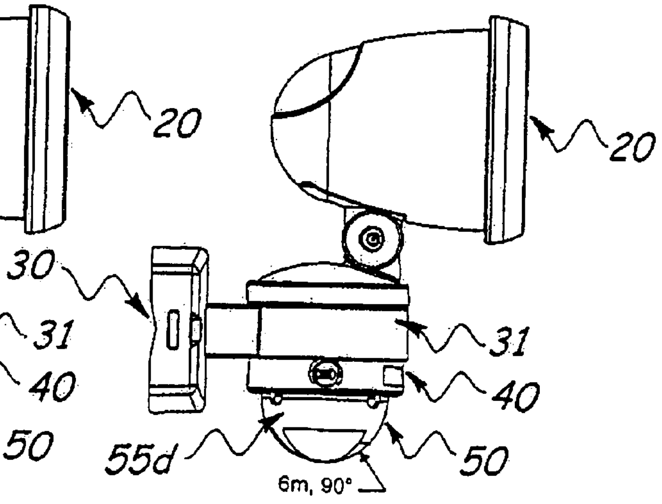
FIG. 5*d* shows a fourth detection position of the motion detector device selected for a zone of 6 meters and 90 degrees.

As seen in FIG. 4*c*, the lamp assembly (20) is turned to another side of the device to face another focusing zone. The rest of the assemblies are likewise aligned.

FIGS. 5*a* to 5*d* show four detecting positions of the invention whence the lens assembly (50) is rotated manually to select its focusing view. The lamp assembly (20) and the rotation assembly (40) are likewise aligned. A detection position relates to the pre-determined range and angle of detection of the focusing view designed for a selected optical segment of the lens assembly (50). Respective surface patterns are shown on the dome portion of the semi-spherically shaped lens assembly (50).

FIGS. 6*a* to 6*d* show various lenses (52) are incorporated to form the lens assembly (50), representing four focusing views. Four patterns (55*a*-55*d*) correspond to four focusing views. To facilitate explanation, a picture of the sensor seat (46) and the pyro-sensor (43) are placed at the centre of the lens assembly (50). It is important to note that the sensor seat (46) is substantially unchanged in position once aligned and faces towards the front of the motion detector device (10). Upon rotation, a patterned segment of the lens assembly (50), representing a particular focusing view, is placed in front of the sensor seat (46).

In this embodiment, four focusing views are disclosed, i.e. (a) 12 meters and 90 degrees, (b) 12 meters and 15 degrees, (c) 3 meters and 90 degrees, and (d) 6 meters and 90 degrees. The detection range is designed for short or long range. For an example, infrared radiation rays may be received from a distance of 3 meters to 12 meters. The angle of covering zones ranges from 15 degrees to 90 degrees. Infrared radiation rays may be received from a broad or narrow background. There are practical reasons why some focusing views are narrow and long, while some focusing views are broad. With the present invention, an installer has a choice of four focusing views on the motion detector device (10). He/she is able to make field adjustment to meet respective requirement. In this way, an invention with four focusing views can be installed to accommodate various situations.

Figure 7B:
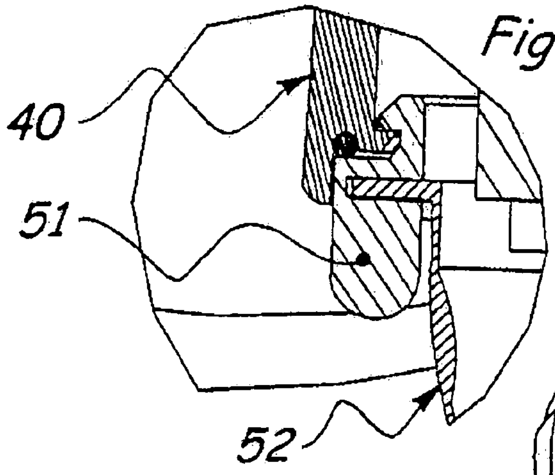
FIG. 7*b* shows an enlarged view of the highlighted part in FIG. 7*a*, showing partially how a lens is attached to a lens frame and the rotation assembly.
Figure 7A:
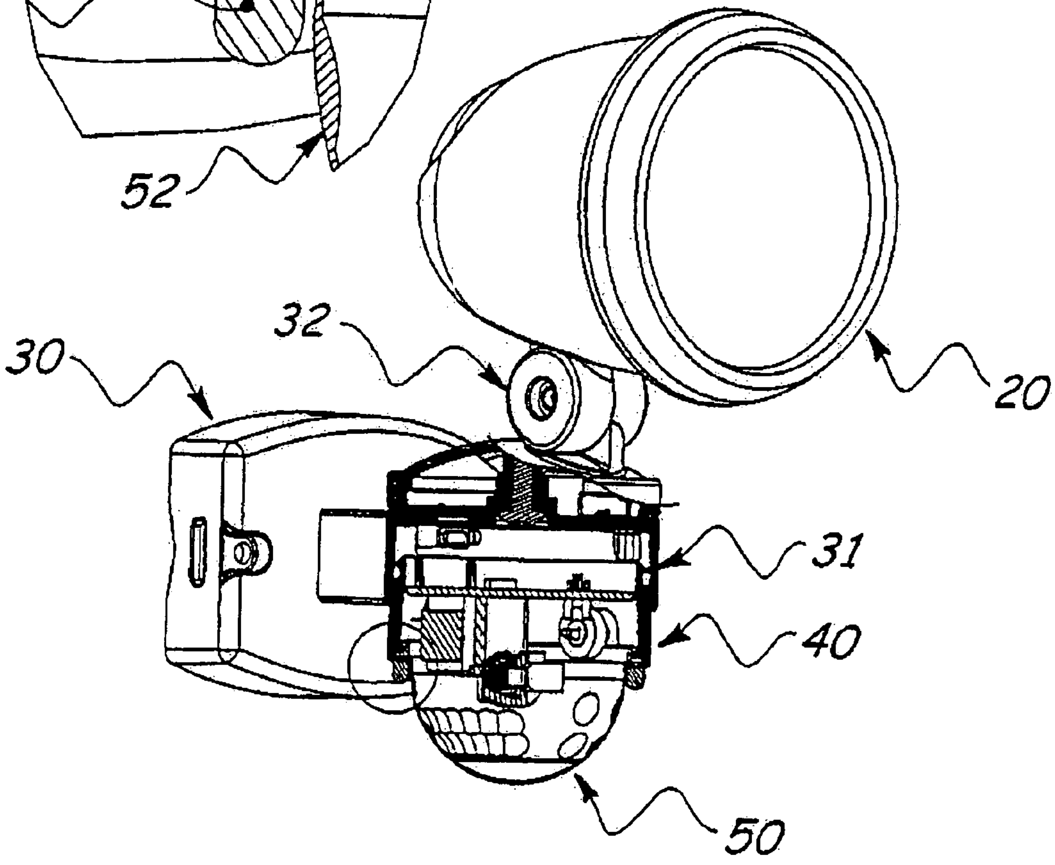
FIG. 7*a* shows a partial cross-sectional view of a rotation assembly, connected to a lamp assembly and a junction box assembly.
Figure 8D:
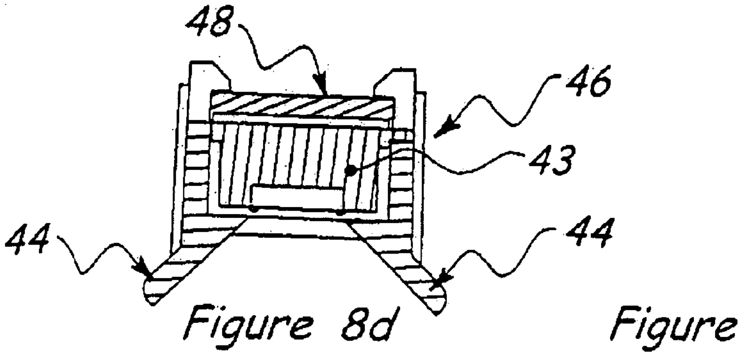
FIG. 8*d* shows an enlarged plan view of the sensor seat, the pyro-sensor and a sensor PCB highlighted in FIG. 8*c*.
Figure 8C:
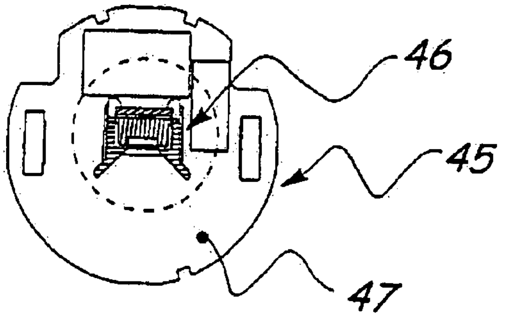
FIG. 8*c* shows a plan view of the main PCB assembly, with the sensor seat and a pyro-sensor highlighted.
Figure 8B:
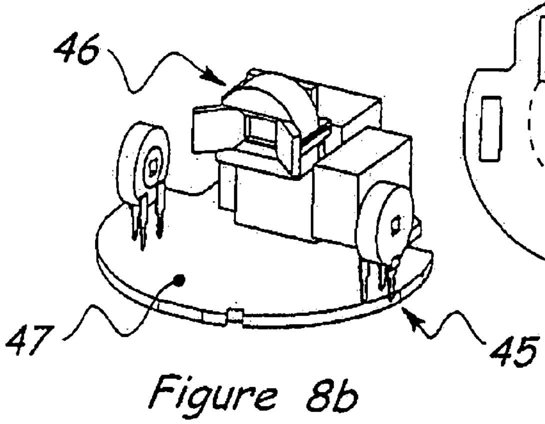
FIG. 8*b* shows the assembled diagram of the main PCB assembly in its inverted position.
Figure 8A:
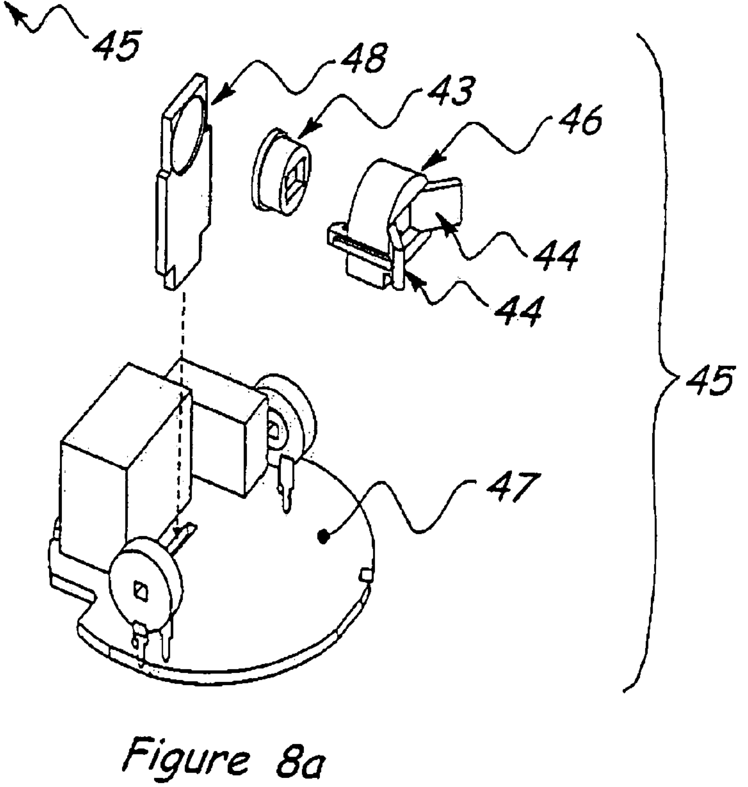
FIG. 8*a* shows an assembly diagram, in its inverted position, of the components making up a main printed circuit board (PCB) assembly incorporating a sensor seat to be placed inside the lens assembly and attached permanently to the rotation assembly.

An assembled view of the main components of the motion detector device (10) is partially shown in FIG. 7*a*. As seen in FIG. 7*b*, the lens (52) in the lens assembly (50) is attached to a lens frame (51), which in turn rotationally attaches to the bottom opening of the rotation assembly (40).

Figure 9:
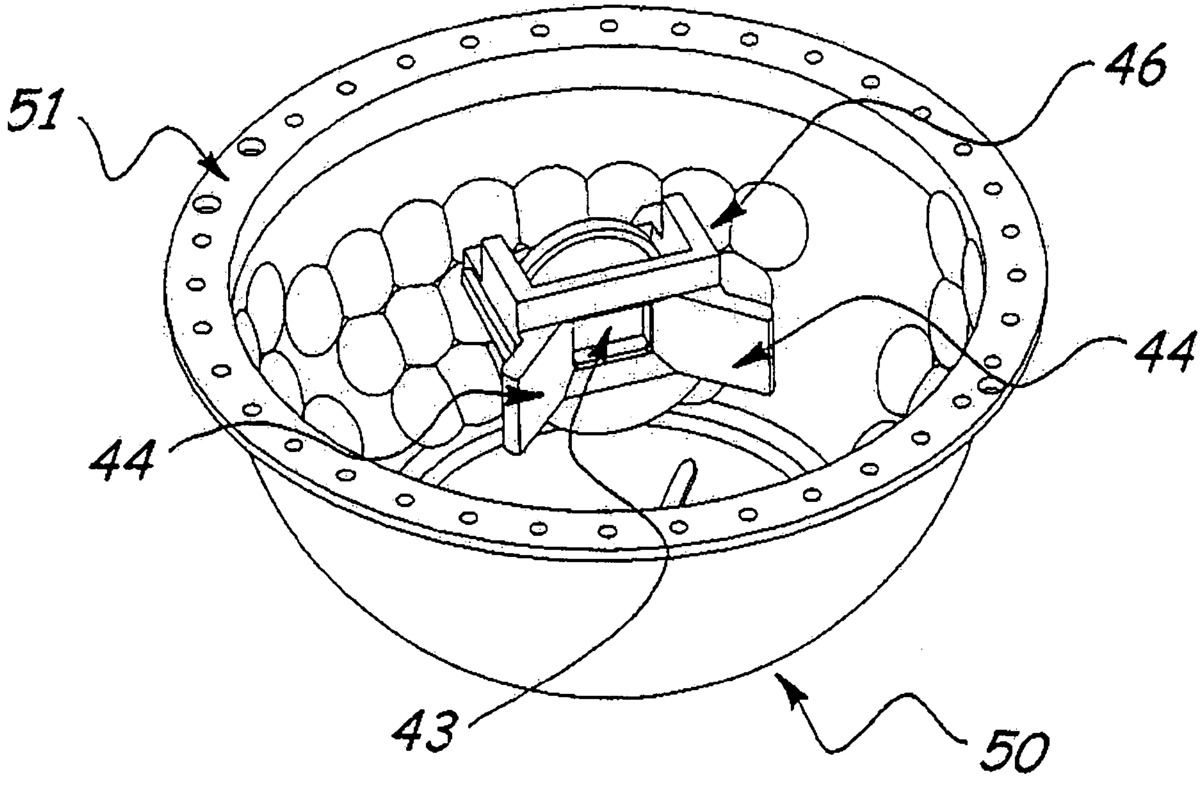
FIG. 9 shows partially a perspective view of the sensor seat being placed at the centre of the semi-spherically shaped lens assembly.

As seen in FIGS. 8*a* to 8*d*, the main components of the main PCB assembly (45) comprise the sensor seat (46), the pyro-sensor (43), a sensor PCB (48) and a base plate (47) are to be assembled and attached to the rotation assembly (40). An inverted position is shown. The pyro-sensor (43) and the sensor PCB (48) are retained within the sensor seat (46) with the assistance of a reverse hook means. The sensor PCB (48) is then attached to the base plate (47). It is important to note that two wings (44) are designed to protrude outwardly from the front of the sensor seat (46), which define and limit the incoming infrared rays from more than 90 degrees. In other words, as seen in FIG. 9, the angle between these two wings (44) is the maximum angle defined in the particular focusing view. In the preferred embodiment, four focusing views of 90 degrees and 15 degrees are defined, and so the angle of the wings (44) is made to 90 degrees. In another example, four focusing views of 120, 110, 90 and 40 degrees may be designed and so the angle between the two wings (44) would be 120 degrees.

The intention of the present invention is not restricted to the embodiment illustrated and described above. Modifications and alterations of detail can be made within the scope of the invention.

In the preferred embodiment of the present invention, the lenses (52) in the lens assembly (50) are made of high-density poly-ethylene (HDPE) material. It is important to note that dotted or Fresnel lens (52) configuration can also be used. According to the preferred embodiment of the present invention, the entire lens assembly (50) carries lenses. The lens assembly (50) is incorporated with four stacked-up segments or lenses with pre-determined focusing views, all moulded together. Each focusing view is constituted by a plurality of multifaceted lenses (52) with predetermined individual focus.

Figure 10:
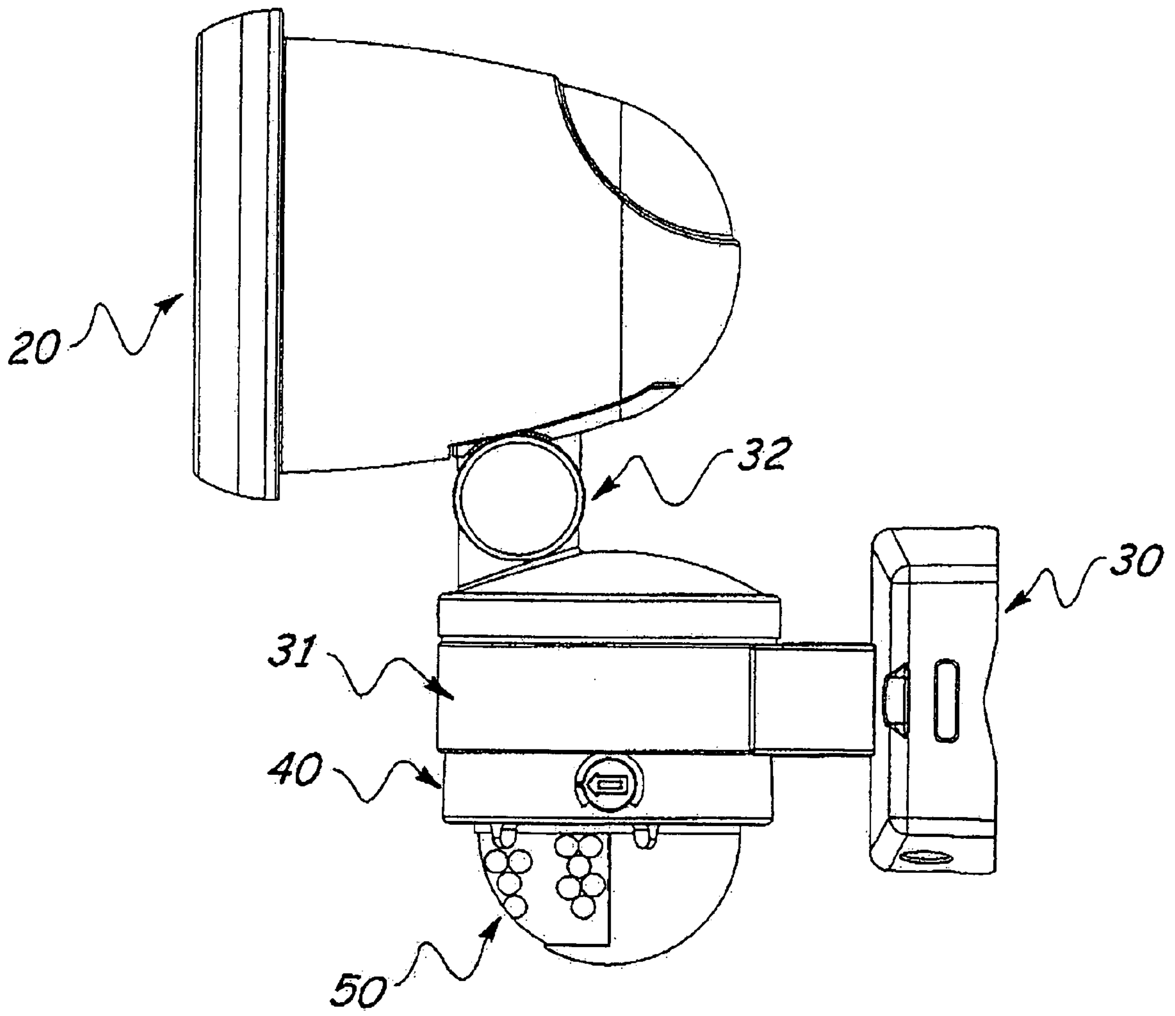
FIG. 10 shows the side view of another preferred embodiment of a motion detector device in accordance to the invention, where half of the semi-spherically shaped lens assembly carries lenses.

In another preferred embodiment of the present invention as seen in FIG. 10, half or portion of the lens assembly (50) carries optical segments or lenses (52) with pre-determined focusing views.

Figure 11:
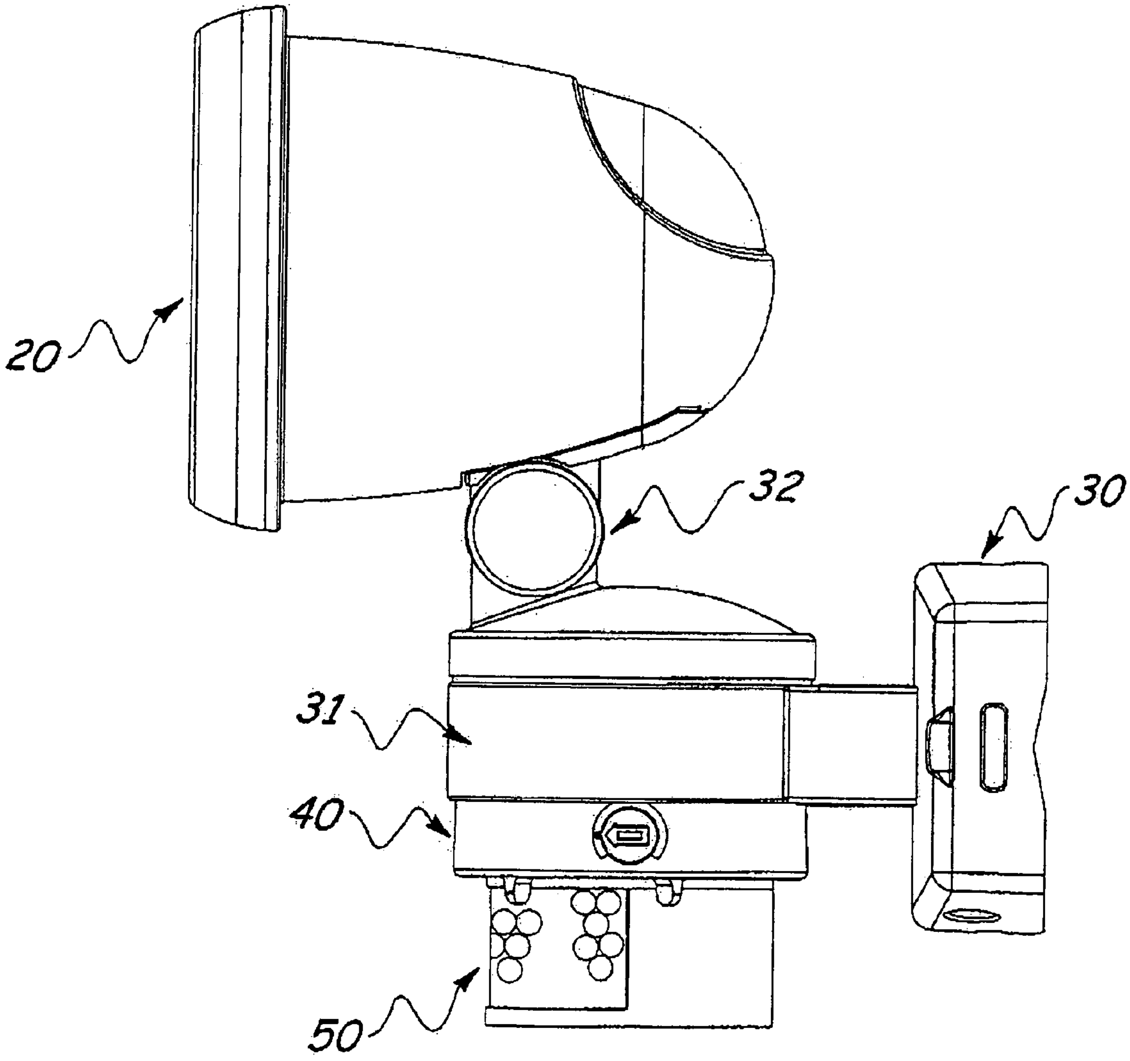
FIG. 11 shows the side view of yet another preferred embodiment of a motion detector device in accordance to the invention, where the lens assembly assumes a cylindrical shape.

In yet another embodiment of the present embodiment of the present invention, as seen in FIG. 11, the lens assembly (50) may assume a cylindrical shape. Entire or half or portion of the lens assembly (50) carries optical segments or lenses (52) with pre-determined focusing views.

Modification can also be adapted to the three-step alignment. In a two-step alignment, the vertical axis of the lamp assembly (20) is first aligned with the central indicating line (41) on the rotation assembly (40), so that the two assemblies are locked to move together. The zone-indicating marks (54) on the lens assembly (50) are next aligned with the side indicating lines (42) on the rotation assembly (40).

The present invention also teaches methods of selecting a specific focusing view for a motion detector device.

A method of selecting a specific focusing view for a motion detector device (10), made up from a lamp assembly (20), a junction box assembly (30) with a cylindrically shaped holding arm (31), a rotation assembly (40) incorporating a sensor seat (46), a pyro-sensor (43) and circuitry, and a lens assembly (50), comprises the steps of:

incorporating and moulding a plurality of multifaceted lenses (52) with pre-determined focuses constituting different focusing views to form the lens assembly (50);

providing with zone-indicating marks (54) along the circumference of a lens frame (51) of the lens assembly (50) denoting edges of each focusing view;

attaching permanently a main PCB assembly (45) onto the rotation assembly (40) and carrying the sensor seat (46) inside to face the front of the motion detector device (10);

providing with a central indicating line (41) and two side indicating lines (42) on the rotation assembly (40);

rotationally aligning the vertical axis of the lamp assembly (20) with the central indicating line (41) on the rotation assembly (40);

rotationally aligning two zone-indicating marks (54) on the lens assembly (50) with the two side indicating lines (42) denoting the edges of each focusing view, whereby a focusing view on the lens assembly (50) is rotationally selected for the motion detector device (10).

A method of selecting a specific focusing view for a motion detector device (10) further comprises the step of incorporating and moulding four multifaceted lenses (52) with pre-determined focuses constituting four focusing views to form the lens assembly (50).

A method of selecting a specific focusing view for a motion detector device (10) further comprises the steps of:

providing two wings (44) on the sensor seat (46) carried inside the main PCB assembly (45), which extends outwardly; and adjusting the angle between the two wings (44) to the maximum angle of detection of the focusing views designed on the lens assembly (50).

A method of selecting a specific focusing view for a motion detector device (10) further comprises the steps of:

rotating the lamp assembly (20) to face a viewing zone, rotating and aligning the rotation assembly (40) with the lamp assembly (20), and rotating and aligning the lens assembly (50) to align with the above aligned lamp (20) and rotation (40) assemblies, whereby the three assemblies (20, 40, 50) rotate, as a whole, relative to the central axis of the holding arm (31).

A method of selecting a specific focusing view for a motion detector device (10) further comprises the steps of:

locking the lamp assembly (20) with the rotation assembly (40), rotating the locked lamp (20) and rotation (40) assemblies to face a viewing zone, and rotating and aligning the lens assembly (50) with the locked lamp (20) and rotation (40) assemblies, whereby the three assemblies (20, 40, 50) rotate, as a whole, relative to the central axis of the holding arm (31).

What is claimed is:

1. A method of selecting a specific focusing view for a motion detector device comprising a lamp assembly, a junction box assembly with a cylindrically shaped holding arm, a rotation assembly incorporating a sensor seat, a pyro-sensor and circuitry, and a lens assembly, the method comprising:

incorporating and moulding a plurality of multifaceted lenses with pre-determined focuses constituting different focusing views to form the lens assembly;

providing with zone-indicating marks along the circumference of a lens frame of the lens assembly denoting edges of each focusing view;

attaching permanently a main printed circuit board assembly onto the rotation assembly and carrying the sensor seat inside to face the front of the motion detector device;

providing with a central indicating line and two side indicating lines on the rotation assembly;

rotationally aligning the vertical axis of the lamp assembly with the central indicating line on the rotation assembly; and rotationally aligning two zone-indicating marks on the lens assembly with the two side indicating lines denoting the edges of each focusing view, whereby a focusing view on the lens assembly is rotationally selected for the motion detector device.

2. A method of selecting a specific focusing view for a motion detector device as in claim 1, further comprising:

incorporating and moulding four multifaceted lenses with pre-determined focuses constituting four focusing views to form the lens assembly.

3. A method of selecting a specific focusing view for a motion detector device as in claim 1, further comprising:

providing two wings on the sensor seat carried inside the main PCB assembly, which extends outwardly; and adjusting the angle between the two wings to the maximum angle of detection of the focusing views designed on the lens assembly.

4. A method of selecting a specific focusing view for a motion detector device as in claim 1, further comprising:

rotating the lamp assembly to face a viewing zone;

rotating and aligning the rotation assembly with the lamp assembly, and rotating and aligning the lens assembly to align with the above aligned lamp and rotation assemblies;

whereby the three assemblies rotate, as a whole, relative to the central axis of the holding arm.

5. A method of selecting a specific focusing view for a motion detector device as in claim 1, further comprising:

locking the lamp assembly with the rotation assembly, rotating the locked lamp and rotation assemblies to face a viewing zone, and rotating and aligning the lens assembly with the locked lamp and rotation assemblies, whereby the three assemblies rotate, as a whole, relative to the central axis of the holding arm.

* * * * *